(12) United States Patent
Jung et al.

(10) Patent No.: US 9,485,905 B2
(45) Date of Patent: Nov. 8, 2016

(54) HARVESTER WITH PREDICTIVE GROUND SPEED REGULATION

(71) Applicant: Deere & Company, Moline, IL (US)

(72) Inventors: Benedikt Jung, Kaiserslautern (DE); Philipp Muench, Kaiserslautern (DE)

(73) Assignee: DEERE & COMPANY, Moline, IL (US)

( * ) Notice: Subject to any disclaimer, the term of this patent is extended or adjusted under 35 U.S.C. 154(b) by 119 days.

(21) Appl. No.: 14/220,575

(22) Filed: Mar. 20, 2014

(65) Prior Publication Data

US 2014/0338298 A1    Nov. 20, 2014

(30) Foreign Application Priority Data

May 17, 2013 (DE) .......................... 10 2013 209 197

(51) Int. Cl.
*A01D 41/127* (2006.01)
*A01D 34/00* (2006.01)

(52) U.S. Cl.
CPC ........... *A01D 34/006* (2013.01); *A01D 41/127* (2013.01); *A01D 41/1271* (2013.01); *A01D 41/1274* (2013.01)

(58) Field of Classification Search
CPC combination set(s) only.
See application file for complete search history.

(56) References Cited

U.S. PATENT DOCUMENTS

| 5,995,895 | A | * | 11/1999 | Watt | A01B 79/005 56/10.2 G |
|---|---|---|---|---|---|
| 6,119,442 | A | * | 9/2000 | Hale | A01D 41/127 56/10.2 H |
| 2003/0004630 | A1 | * | 1/2003 | Beck | A01D 41/127 701/50 |
| 2006/0123757 | A1 | * | 6/2006 | Baumgarten | A01D 41/127 56/10.2 R |
| 2007/0299591 | A1 | * | 12/2007 | Goering | A01D 46/085 701/50 |

FOREIGN PATENT DOCUMENTS

| DE | 10130665 A1 | 1/2003 |
|---|---|---|
| DE | 102011017621 A1 | 10/2012 |
| EP | 1243173 A1 | 9/2002 |

* cited by examiner

*Primary Examiner* — Alicia Torres

(57) ABSTRACT

A combine harvester (10), has driven wheels or tracks (14) for moving the combine harvester; a system for detecting characteristics of crop plants (96) in front of the combine harvester and for calculating an expected mass throughput of the combine harvester from the detected physical characteristics; an electronic control (80), configured to control the ground speed of the combine harvester to maintain a desired mass throughput of the combine harvester in consideration of the expected mass throughput of the combine harvester; and a sensor (86) for detecting a combine harvester parameter that is indicative of an actual mass throughput of the combine harvester; wherein the electronic control is configured to compare an output value of the sensor to a value indicating the expected mass throughput and to use a result of the comparison as feedback to control the speed of the combine harvester.

5 Claims, 3 Drawing Sheets

# US 9,485,905 B2

HARVESTER WITH PREDICTIVE GROUND SPEED REGULATION

FIELD OF THE INVENTION

This invention relates to agricultural harvesters. More particularly, it relates to ground speed regulation of agricultural harvesters. More particularly, it relates to ground speed regulation of agricultural harvesters based upon crop throughput.

BACKGROUND OF THE INVENTION

With agricultural harvesters, crop throughput is sensed for automatic adjustment of crop conveyance and/or crop processing devices. The crop throughput is also frequently sensed for the purpose of partial area-specific cultivation.

With the aid of a measured crop throughput, the ground speed of the harvester in a field can be adjusted by a corresponding control in such a way that a desired crop throughput is attained, which corresponds to an optimal utilization of the harvester.

A method is known for the determination of the crop throughput with corresponding sensors in the harvester (see, for example, EP 1243173 A1). Since the measurement takes place only after the crop has been taken up by the harvester, a rapid change in the crop throughput with such sensors cannot be promptly compensated for by a corresponding change of the traveling speed. As a result this can result in a low load or overload (even clogging) of the crop processing devices.

DE 10 2011 017 621 A1 proposes detecting the upper portion of a group of plants on a field by means of a laser distance sensor. The signal of the laser distance sensor also provides information regarding the density of the group of plants, since with groups full of gaps, rays penetrating to the ground result in larger variations in the traveling times and thus the evaluated distances, while dense groups give more homogeneous distance values.

Furthermore, a radar distance sensor is used. The rays of the radar distance sensor penetrate the group of plants and enable an adjustment of a ground profile. The ground profile (in combination with the measurement values of the laser distance sensor) is used to determine the height of the plants.

The intensities and traveling times of radar waves reflected from the plants are detected in order to evaluate the geometric density of the plants as well as their moisture and mass density. The "geometric density" means the volume of the plants per unit volume or area of the field.

These intensities and traveling times are used to adjust the ground speed of the harvester in a predictive manner to provide a desired mass throughput.

The system does not, however, compare the distance sensor values with others throughput sensor values that are detected on board the harvester. Therefore throughput predicted by the distance sensors is based exclusively on the measurement values of the two distance sensors (e.g. radar and laser). If these two sensors are not calibrated with sufficient accuracy for the particular group of plants to be harvested, then the throughputs calculated based on the sensor signals will be inaccurate.

DE 101 30 665 A1 describes a combine harvester with a laser distance sensor that oscillates back and forth around the vertical axis and successively scans the group of crops standing in front of the combine harvester in the lateral direction.

The traveling times of the reflected waves are detected by a receiver, which, with the aid of the traveling times and the geometric arrangement of the distance meter, determines the vertical area of the group of crops. In addition, with the aid of the intensity of the reflected waves, the volume density (space filling degree) of the crops is estimated.

The system determines the predicted throughput rate (measured in volume per unit time), by multiplying the volume density with the vertical area and speed. A moisture sensor, which views the group of crops in a predictive manner, determines the moisture of the crops so as to determine the mass density and, finally, with the aid of the throughput rate, to determine the expected mass throughput. The mass throughput, in turn, is used by the system to automatically determine an appropriate ground speed. With the aid of a measurement value, determined sensorially on board a combine thresher, using a crop throughput sensor, which, for example, detects the drive torque of a threshing drum, the throughput rate can be determined.

DE 10 2011 085 380 A1 describes another harvester with sensors which consider, in a predictive manner, the group of plants and work with electromagnetic waves, from whose signals statistical parameters are derived that are compared by sensors interacting with crops gathered by the harvester to automatically determine relationships between the statistical parameters and the crop characteristics and subsequently, to use the signals of the predictive sensors, taking into consideration the evaluated relationships for the automatic control of the harvester. The crop parameters are, among other things, the group density and the moisture. The predictive sensors can, for example, detect the intensities and polarization of the reflected waves.

The arrangements in accordance with DE 101 30 665 A1 and DE 10 2011 085 380 A1 also take into consideration sensor values obtained on board the agricultural harvester, so as to evaluate more precisely the magnitudes obtained from the signals of the sensors that work in a contactless manner, with the aid of the determined relationships.

In DE 101 30 665 A1, a correction table is produced, which corrects the crop throughputs determined with the electromagnetic sensor, with the aid of the throughputs measured on board. DE 10 2011 085 380 A1 determines relationships between statistical parameters of the crops and the detected throughputs.

In both systems, the sensor values obtained on board the agricultural harvester are thus used indirectly, in order to first convert, with them, the values of the contactless sensors into a more accurate crop throughput, which is then, in turn, used as a single regulation input magnitude for the control of the speed.

The function of the speed regulation is based on absolute measurement values of the contactless sensors, whose accuracy may not attain satisfactory results. Furthermore, the methods, under steady-state conditions, are not always accurate and as a result of the needed evaluation times of the statistical parameters, have long reaction times.

It is the goal of the present invention to provide an agricultural harvester in which the aforementioned disadvantages are not present or are present to a reduced extent.

SUMMARY OF THE INVENTION

In accordance with one aspect of the invention, an agricultural harvester comprises propulsion means to move the harvester at a speed "V" over a field. A suitable arrangement is used for the continuous, predictive, contactless detection of group of crops standing in front of the harvester and for the preparation of data regarding an expected mass throughput in the harvester. A control is configured to control the ground speed of the harvester automatically, taking into consideration the expected throughput, calculated by using the data of the aforementioned arrangement, in the sense of maintaining a desired value of the mass throughput. A sensor is used to detect a magnitude independent of the actual mass throughput of the harvester. The control is configured to compare the starting value of the sensor to a value dependent on the expected mass throughput, and the result of the comparison is continuously used as a feedback value for the control or regulation of the ground speed.

Thus, data for the mass throughput are determined in a predictive manner by the aforementioned arrangement for the predictive, contactless detection of a group of crops standing in front of the harvester; however, in addition, a magnitude representative of the mass throughput is detected on board the harvester and compared to a value that is a value that is expected by the control and is dependent on the mass throughput. Any deviations between the measurement value of the sensor and the expected value are used as a feedback value for the ground speed adjustment. In this way, a more direct and more rapid consideration of the measurement value of the sensor obtained on board the harvester is attained than in the state of the art. This procedure is particularly suitable for arrangements that can detect changes in the crop throughput well, but not the absolute values of the crop throughput. The latter are taken into consideration in the speed determination, according to this invention, by the sensor for the detection of the magnitude dependent on the mass throughput of the harvester and its comparison to the expected value and the feedback of the result of the comparison.

The arrangement for the predictive, contactless detection of the group of crops before the harvester and for the preparation of data with regard to an expected mass throughput in the harvester is preferably a distance meter with a transmitter for the successive impingement of a group of crops standing in front of the harvester with electromagnetic waves, a receiver to receive waves reflected by the group of crops, and an evaluation unit, which uses the traveling times and/or amplitudes of the received waves to calculate data, with the aid of which an expected mass throughput in the harvester can be evaluated. Other embodiments of the aforementioned arrangement are also conceivable, such as, in particular, cameras with image processing systems.

The distance meter is, in particular, a radar sensor, in which the electromagnetic waves are radiated from the sender, horizontally and/or vertically polarized radar waves are reflected, and from the group of plants, the receiver receives vertically polarized radar waves and/or horizontally polarized radar waves. Radar waves of a single frequency or different frequencies can hereby be used. With the aid of the received radar waves, the evaluation unit evaluates, in particular, the time derivation of the space filling degree of the group of plants with the dry mass and water and the volume taken up. Alternatively or additionally, any other distance meters can be used, for example, laser-distance meters and the like, working in the visible or infrared range.

In a preferred embodiment, the sensor detects a pressure in a hydraulic cylinder, which moves a belt variator to drive an axial threshing and/or separating rotor. The sensor, however, can also record any other variables, such as the driving torque of a feederhouse of a tangential threshing drum or the layer thickness in the feederhouse and the moisture of the crops.

Appropriately, the control takes into consideration the time delay between the creation of the expected value, dependent on the throughput, and the detection by the sensor. To this end, the value can be delayed (stored) for a while and only then be supplied to a comparison module, when the plants detected by the distance meter interact with the sensor.

The control can convert the result of the comparison into a mass throughput, which is subtracted from a mass throughput calculated with the aid of the aforementioned arrangement.

The control can also comprise a model of the harvester that is used to determine the value dependent on the expected throughput, which is also used to specify the ground speed. The value dependent on the expected throughput is predicted on the basis of the model. The model receives the result of the comparison between the starting value of the sensor and the value dependent on the expected mass throughput as an input value and is dynamically adapted to the actual circumstances. With the aid of the actually measured values, the estimate and prediction of the model are constantly refined and adapted.

In accordance with another aspect of the invention, a combine harvester, comprises: driving means for moving the combine harvester at a ground speed over a field; a system for detecting physical characteristics of a group of crop plants standing in front of the combine harvester and for calculating an expected mass throughput of the combine harvester from said detected physical characteristics; an electronic control, which is configured to automatically control the ground speed of the combine harvester to maintain a desired mass throughput of the combine harvester by taking into consideration the expected mass throughput of the combine harvester; and a sensor for detecting a parameter of the combine harvester indicative of an actual mass throughput of the combine harvester; wherein the electronic control is configured to compare an output value of the sensor to a value indicative of the expected mass throughput and to use a result of the comparison as a feedback value to control the ground speed of the combine harvester.

The system may further comprise a distance sensor having a transmitter for transmitting successive electromagnetic waves against a group of crop plants standing in front of the combine harvester, a receiver configured to receive reflections of the successive electromagnetic waves from the group of crop plants, and an evaluation unit for calculating the expected mass throughput in the combine harvester, with an aid of traveling times and/or amplitudes of the reflections.

The successive electromagnetic waves may be radiated, horizontally and/or vertically polarized radar waves, and the receiver May received vertically polarized radar waves and/or horizontally polarized radar waves reflected from the group of crop plants, and the successive electromagnetic waves may comprise radar waves of a single frequency or of different frequencies, and the evaluation unit may be configured to calculate a time derivation of a space filling degree of the group of crop plants with dry mass and water and a taken-up volume, with an aid of the radar waves received.

The sensor may detect a pressure in a hydraulic cylinder, and the hydraulic cylinder may be configured to adjust a belt variator for driving and axial threshing and separating rotor.

The electronic control may be configured to take into consideration a time delay between the producing of the value dependent on the expected mass throughput and a magnitude detected by the sensor.

The electronic control may be configured to convert the result of the comparison into a mass throughput error, which is subtracted from a mass throughput that is calculated with an aid of data of an arrangement for a predictive, contactless detection of a group of crop plants standing in front of the combine harvester.

The electronic control may comprise a model of the combine harvester, which is used for a determination of the value dependent on the expected mass throughput, which is also used for a specification of the ground speed.

The electronic control may be configured to compare the value dependent on the expected mass throughput, which is time-delayed, to the value of the sensor.

The arrangement in accordance with the invention can be used on self-propelled harvesters or those pulled by a vehicle or added thereon, for example, combine threshers, baling presses, or field choppers.

DETAILED DESCRIPTION OF THE PREFERRED EMBODIMENTS

In the discussion below and in the Figures, angle brackets around a variable indicate an expected, estimated, or calculated value of that variable and an apostrophe after a variable indicates a time derivative of that variable.

Figure 1:
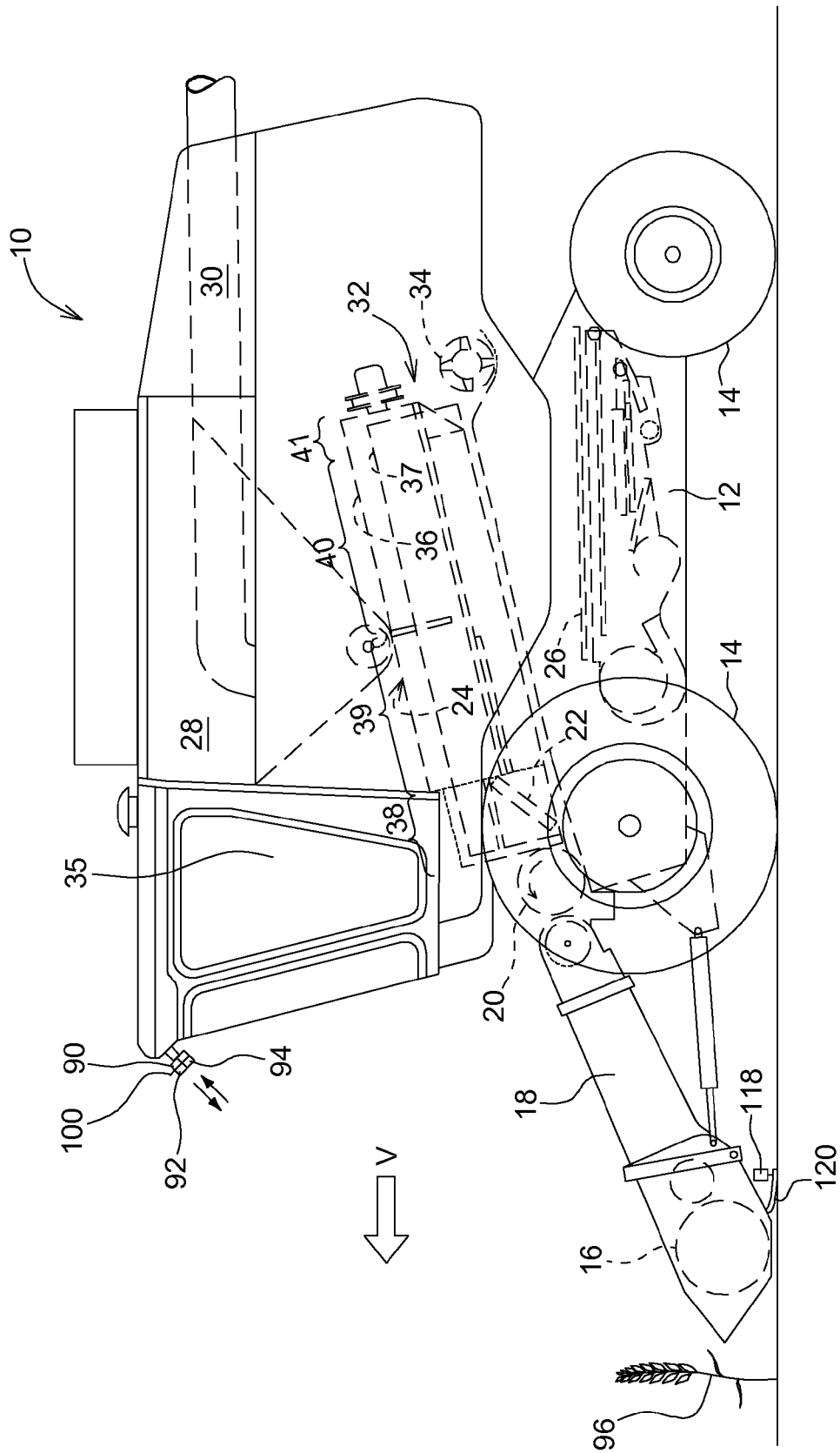
FIG. 1 shows a semi-schematic side view of an agricultural combine harvester.

FIG. 1 shows an agricultural combine harvester 10 with a supporting structure 12, which is provided with wheels 14 that engage the ground and drive the agricultural combine harvester 10 over the ground. Although the combine harvester 10 is shown with wheels 14, it could also be provided with two or four belted tracks.

A harvesting attachment 16 is used for the harvesting of crop and supplies the harvested crop to a feederhouse 18. The feederhouse 18 contains a conveying device to supply the harvested crop to a conveying drum 20. The conveying drum 20 moves the crop upward through an inlet transition section 22 and a crop processing device 24 (which is rotatable and is configured for threshing and separating). The crop processing device 24 shown is situated axially in the combine thresher; it could, however, also be situated in other orientations relative to the longitudinal axis of the combine harvester 10.

Although the invention under consideration is described with the aid of a crop processing device 24 with a rotor, it could also be used on a combine harvester 10 with a conventional, transversely arranged threshing drum that interacts with a threshing concave.

The crop processing device 24 threshes and separates the harvested crops. The grain and the chaff fall through grates on the bottom of the crop processing device 24 into a cleaning system 26. The cleaning system 26 removes the chaff and leads the clean grain to a (not depicted) elevator for clean grain. The elevator for clean grain lays the grain in a grain tank 28. The clean grain in the grain tank 28 can be sent to a truck or trailer by an unloading auger 30.

Threshed straw, freed from the grain, is sent by the crop processing device 24 through an outlet 32 to an ejection drum 34. In turn, the ejection drum 34 pushes the straw out at the rear of the combine harvester 10. It should be noted that the ejection drum 34 could also conduct the crops residues freed from the grain directly to a straw chopper. The operation of the combine harvester 10 is controlled from an operator's cabin 35.

The crop processing device 24 comprises a rotor housing 36 (that is cylindrical) and a rotor 37 situated in the rotor housing 36. The front part of the rotor 37 and the rotor housing 36 define a feeding section 38. Downstream from the feeding section 38, there are a threshing section 39, a separating section 40, and an outlet section 41. The rotor 37 is provided in the feeding section 38 with a conical rotor drum, which has spiral-shaped feeding elements for engaging into the crops that it receives from the conveying drum 20 and from the inlet transition section 22. Directly downstream from the feeding section 38, there is the threshing section 39. In the threshing section 39, the rotor 37 has a cylindrical rotor drum, which is provided with a number of threshing elements to thresh crops received from the feeding section 38. Downstream from the threshing section 39, there is the separating section 40, in which the grain still contained in the threshed crops is freed and falls, through bottom grates in the rotor housing 36, into the cleaning system 26. The separating section 40 transitions into the outlet section 41, in which the crops (straw), freed from the grain, are ejected from the crop processing device 24.

Figure 2:
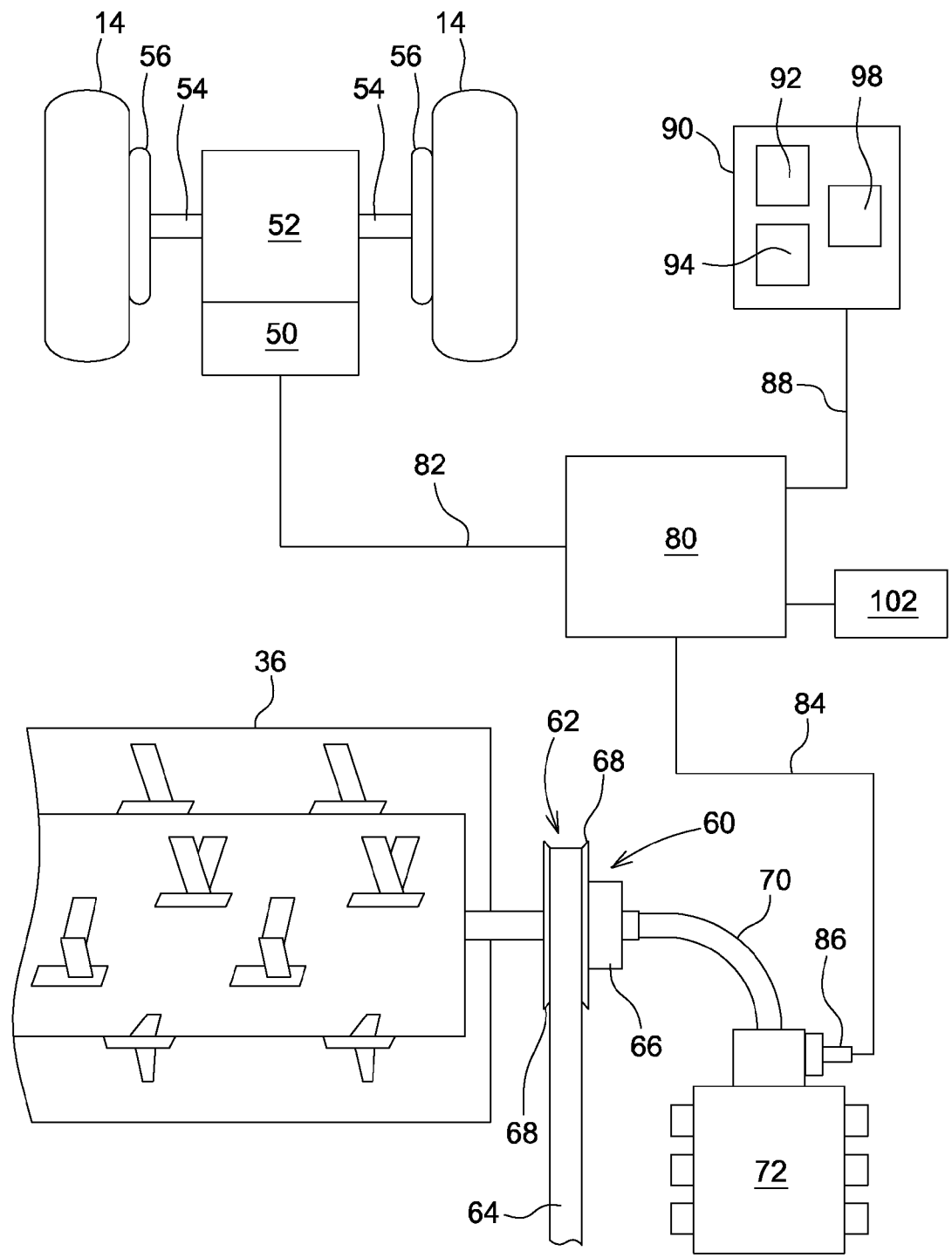
FIG. 2 shows an arrangement of a throughput control system in accordance with the invention.

Referring to FIG. 2, the front wheels 14 of the combine harvester 10 are driven by a hydrostatic transmission 50, as shown in FIG. 2. The hydrostatic transmission 50 is driven in a conventional manner by a combustion engine that is not shown. The hydrostatic transmission 50, in turn, drives a control gear 52. Two drive shafts 54 extend from the control gear 52 outward and propel final drives 56 of the front wheels 14. The hydrostatic transmission 50 comprises a hydraulic pump and a hydraulic motor. The hydraulic pump and/or the hydraulic motor are equipped with adjustable swash plates. The adjustable swash plates control the output speed of the hydrostatic transmission 50 and its rotation direction. Electromagnetically controlled valves control the positions of the swash plates. In an alternative configuration, the steerable rear wheels 14 can also be directly driven by wheel motors, which are affixed directly on the wheels 14. The speed of the wheel motors can be controlled by the throughput control system described below.

An adjustable drive 60 with a variable torque drives the rotor 37. The same combustion engine that drives the hydrostatic transmission 50 also propels the adjustable drive 60. The adjustable drive 60 is a belt drive, which comprises a driving belt pulley (not shown) that is a variable belt pulley with a variable diameter (also known as a "belt variator").

A belt 64 extends between the driving belt pulley and the driven belt pulley 62 to transfer rotation power.

A hydraulic cylinder 66 controls the effective diameter of the driven belt pulley 62. The hydraulic cylinder 66 is coupled to the driven belt pulley 62 and moves the side plates 68 that form the sheave of the driven belt pulley 62 closer together or farther apart in order to control the effective diameter of the driven belt pulley 62 relative to the belt 64. By a change in the effective diameter of the belt pulleys, the rotational speed of the driven belt pulley 62 is changed. This pulley arrangement is called a "belt variator".

Pressurized hydraulic fluid is supplied to the hydraulic cylinder 66 through a hydraulic line 70 via a valve assembly 72. The rotor 37 is driven at a constant, selected rotor speed by the belt pulleys with a variable diameter. The torque transferred from the belt 64 and the belt pulley varies with the mass throughput of the crops.

An electronic control 80 controls the ground speed "V" of the combine harvester 10. This means that the electronic control 80 adjusts the ground speed (and hence the harvesting rate) of the combine harvester 10 by adjusting the position of the swash plates of the hydrostatic transmission 50. It adjusts the position of the swash plates by controlling the electromagnetically actuated control valves via a line 82. The electronic control 80 is preferably in the form of an ALU coupled to a memory circuit in which the ALU executes instructions stored in the memory circuit. The various functions and operations described as being performed by the electronic control 80 may be embodied as hardware, software or any combination of the two.

The electronic control 80 receives (through the line 84) an actual hydraulic pressure signal from a hydraulic pressure sensor 86. The hydraulic pressure sensor 86 senses the hydraulic pressure of the hydraulic cylinder 66, which adjusts the adjustable drive 60 with a variable torque. It was discovered that the hydraulic pressure with which the hydraulic cylinder 66 adjusts the adjustable drive 60 is indicative of the mass throughput.

Through another line 88, the electronic control 80 is connected to a radar distance sensor 90, which operates in a contactless manner and which is used, in this embodiment example, as an arrangement for the predictive, contactless detection of a group of crop plants 96 (see FIG. 1) standing in front of the combine harvester 10 and is used to generate data indicating an expected mass throughput in the harvester.

The radar distance sensor 90 comprises a transmitter 92 and a receiver 94 and is affixed on the upper side of the operator's cabin 35.

During operation, the transmitter 92 transmits electromagnetic waves in the radar frequency range, inclined forward, onto the group of crop plants 96 on the field standing in front of the combine harvester 10. The receiver 94 receives waves reflected from the group of crop plants 96 and perhaps from the ground.

An evaluation unit 98 (which could alternatively be integrated into the electronic control 80) evaluates the traveling times and the amplitudes of the waves received by the receiver 94. Preferably, the waves radiated by the transmitter 92 are polarized vertically and the receiver 94 receives, separately from one another, horizontally and vertically polarized waves. Seventy-seven GHz is a suitable frequency of the electromagnetic waves.

The radar distance sensor 90 can reciprocate (i.e. oscillate back and forth) around an approximately vertical axis, or one inclined upward and forward, so as to scan over the cutting width of the harvesting attachment 16, in a lateral direction.

Alternatively, the radar distance sensor 90 may comprise a suitable number of transmitters 92 and receivers 94, which are located laterally, next to one another, so as to simultaneously obtain a number of traveling times and amplitudes over the cutting width of the harvesting attachment 16.

A speed sensor 102 supplies the electronic control 80 and the evaluation unit 98 a speed signal with regard to the actual ground speed "V" of the combine harvester 10.

Figure 3:
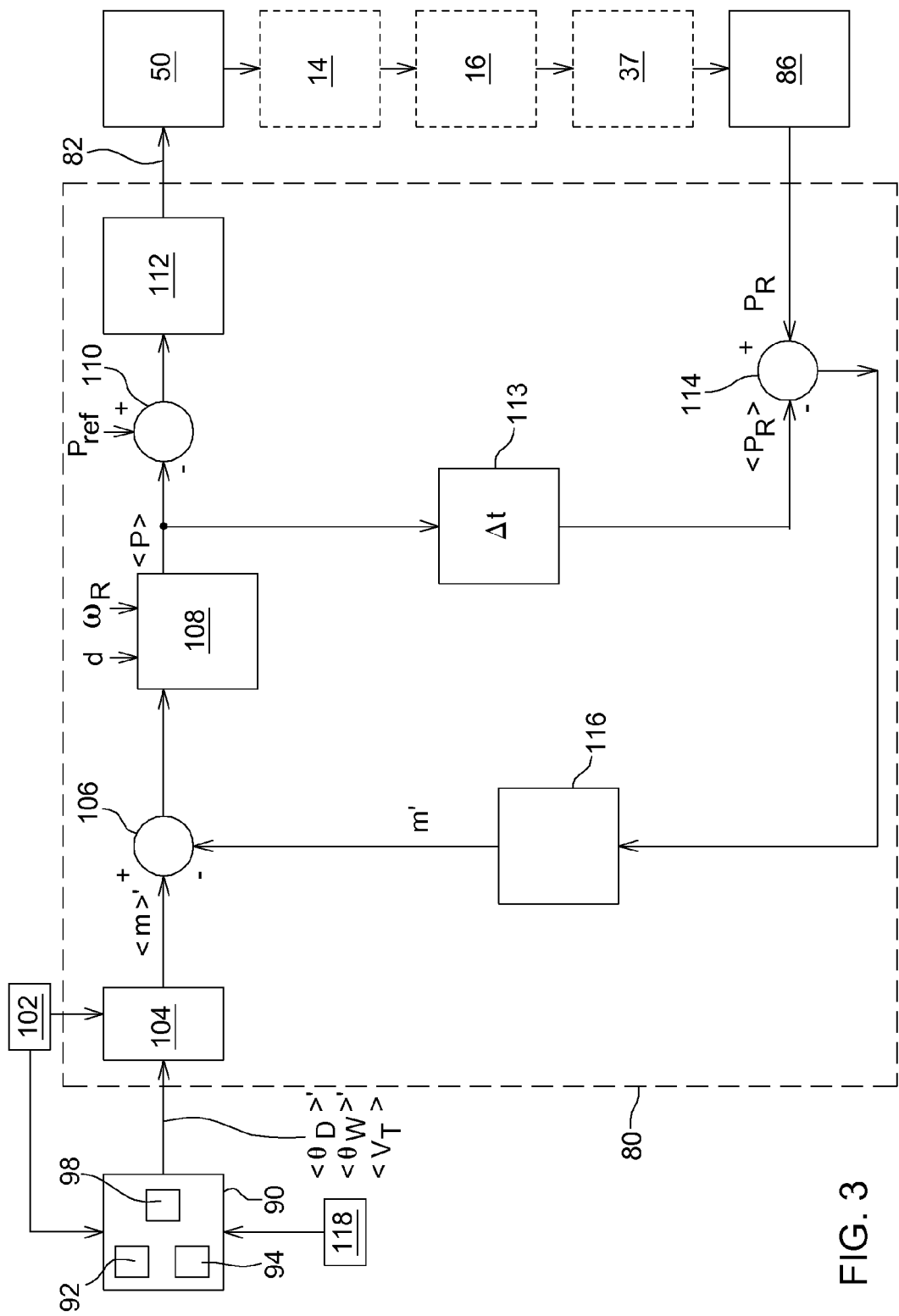
FIG. 3 shows an arrangement of the control system of FIG. 2.

FIG. 3 shows the structure and the mode of functioning of the electronic control 80 in detail. It comprises a mass flow calculator 104, which receives signals from the radar distance sensor 90 and from the speed sensor 102. The mass flow calculator 104 determines an expected throughput ($<m>'$), that is, the mass of crops conveyed, per unit time, from the feederhouse 18 to the combine harvester 10.

This expected mass throughput ($<m>'$) is supplied to a first comparison module 106, which compares it to a measured mass throughput error signal (m') from a mass throughput determining module 116, which will be described below.

The difference determined by the first comparison module 106 is sent to a combine harvester model 108, which calculates an expected pressure ($<p>$) based upon the difference; the expected pressure ($<p>$) is sent to a second comparison module 110. This expected pressure ($<p>$) corresponds to a pressure of the hydraulic pressure sensor 86, which is caused by the not yet harvested group of crop plants 96 standing in front of combine harvester 10 and being investigated by the radar distance sensor 90. The second comparison module 110 compares this expected pressure ($<p>$) to a reference pressure ($p_{ref}$), and the difference is sent to a control circuit 112, which, in turn, controls the transmission ratio of the hydrostatic transmission 50.

A closed loop control path is defined by the front wheels 14, which move the combine harvester 10 with a ground speed ("V") defined by the hydrostatic transmission 50 over the field, together with the harvesting attachment 16, which takes up the plants of the population of crops, and finally the rotor 37, which threshes and separates the plants and whose drive torque, which depends on the mass throughput, is recorded by the hydraulic pressure sensor. Accordingly, the hydraulic pressure sensor 86 records the pressure ($p_R$), which is compared by a third comparison module 114 to an expected pressure ($<p_R>$), which is formed by means of a time delay module 113 from the output signal ($<p>$) of the combine harvester model 108. The result of the third comparison module 114 is sent to the mass throughput determining module 116, which converts the difference between the measured pressure $p_R$ on the hydraulic pressure sensor 86 and the expected pressure ($<p_R>$) on the outlet of the time delay module 113 into a mass throughput error signal (m').

In light of the foregoing, a mode of operation of the electronic control 80 is the following.

The evaluation unit 98 of the radar distance sensor 90 continually derives, with the aid of the vertically and horizontally polarized waves received by the receiver 94, the height $h_o$ of the upper edge of the group of crop plants 96 on the field, on one hand (see, in this regard, the state of the art, in accordance with DE 10 2011 017 621 A1). With the aid of the cutting height ($h_u$) of the harvesting attachment 16 above the ground, which is determined by means of a sensor 118, which detects the angle of sensor arms 120 touching the ground (or a sensor for the detection of the position of the cylinder for the height adjustment of the harvesting attachment 16, which is not shown), the height of the group of crop plants 96 to be taken up is evaluated via the width of the harvesting attachment, in that the individual cutting height ($h_u$) is subtracted from the height ($h_o$) of the upper edge of the group of crop plants 96.

Other procedures for the determination of the cutting height are also conceivable; for example they can be derived from the signals of the radar distance sensor 90 (see, in this regard, DE 10 2011 017 621 A1), whose signals can also be used for the control of the height of the cutting mechanism.

The measurement values of the cutting height ($h_u$) and/or the height ($h_o$) of the upper edge of the group of crop plants 96 can be corrected with the aid of an inertial sensor (not shown) for the detection of the orientation of the combine harvester 10 in space.

The height of the group of crop plants 96 to be taken up is integrated over the working width of the harvesting attachment 16 and multiplied with the ground speed "V" to determine the expected volume rate ($<V_T>'$), which is integrated over time to calculate the volume ($<V_T>$) taken up.

Further, from the signals of the receiver 94, the time derivative ($<\Theta_D>'$) of the space filling degree of the dry mass content of the group of crop plants 96 (which can also be designated as the volumetric solids fraction) and the time derivative ($<\Theta_W>'$) of the space filling degree of the water content of the group of crop plants 96 (which can also be designated as the volumetric water content) are calculated, which is done with the aid of the horizontal and vertical components of the received waves, reflected from the group of crop plants 96. As stated above, the space filling degree ($\Theta$) is the fraction of plants in the volume filled out by the group of crop plants 96.

The aforementioned variables (e.g. $<\Theta_D>'$, $<\Theta_W>'$, and $<V_T>$ and, optionally, $<V_T>'$) are continuously recorded and sent to the mass flow calculator 104. The latter continuously calculates a mass throughput ($<m>'$), which varies as a function of the density of the group of plants, according to the following formula:

$$<m>' = (\rho_D * <\Theta_D>' + \rho_W * <\Theta_W>')* <V_T>. \qquad (1)$$

where "$\rho_D$" is the density of the dry mass and "$\rho_W$" is the density of the water. Both are known and can be regarded as constant. All other variables are likewise known, so that the mass flow calculator 104 is able to calculate the mass throughput ($<m>'$), which depends on the density of the group of crop plants. In addition to the possible change in the density and height in the group of plants in the forward direction, to be taken into consideration in (1), there is also a second variable influencing the mass throughput—namely, the absolute values for the space filling degree ($<\Theta_D>$) of the dry mass content of the group of crop plants and for the space filling degree ($<\Theta_W>$) of the water content of the group of crop plants 96, which, however, is not considered by the mass flow calculator 104, but rather (indirectly) by the combine harvester model 108 (with the third comparison module 114 and the first comparison module 106), since the radar distance sensor 90 generally cannot reliably detect these absolute space filling degrees.

The combine harvester model 108 also receives, as additional input values, the magnitude of the threshing gap (d) and the rotation speed ($\omega_R$) of the rotor 37 and, optionally, other operating parameters of the combine harvester 10.

Based upon the mass throughput from the first comparison module 106 and upon other input variables, the combine harvester model 108, using a mathematical/physical model, continually determines the value ($<p>$) for the pressure in the hydraulic pressure sensor 86 that is expected on the basis of the crop to be harvested. The ground speed "V" is continuously adjusted via the second comparison module 110, the control circuit 112, and the hydrostatic transmission 50 in such a way that a desired nominal pressure ($p_{ref}$) is finally attained. This nominal pressure ($p_{ref}$) can be constant or can be input by the operator, in particular, after calibration with a loss test bowl.

The third comparison module 114 continually compares the actual pressure $p_R$ in the hydraulic cylinder 66, which is detected with the hydraulic pressure sensor 86, to an expected pressure ($<p_R>$), which, as a result of the traveling time of the crop between the detection by the radar distance sensor 90 and the interaction with the rotor 37, is stored by the time delay module 113 for an intermediate period and is delivered to the third comparison module 114, delayed by this traveling time. Any differences are continually converted by the mass throughput determining module 116 into mass throughput error signals (m'), which are subtracted from the mass throughput ($<m>'$) by the first comparison module 106. The mass throughput determining module 116 is used as a feedback of the actual pressure values to the combine harvester model 108 and can be implemented as a feedback factor or matrix.

Thus, if deviations between the pressure ($<p_R>$), expected by the combine harvester model 108, and the actual pressure ($p_R$) appear that can be attributed, for example, to model errors, prediction errors, and measurement inaccuracy, which arises as a result of the only relative measurement of the radar distance sensor 90, the influence variable of the combine harvester model 108 is continually and correspondingly adapted, without any appreciable time delay, in order to again compensate for these deviations. In the steady state, that is, with constantly dense crops, the values ($<p>$) predicted by the combine thresher model converge toward the actually measured values $p_R$, which is ensured by the described procedure (mathematical).

The mode of action of the electronic control 80 can, accordingly, be summarized as follows.

The radar distance sensor 90 detects changes in the mass throughput in a predictive manner.

The combine harvester model 108 calculates a value (here the pressure in the hydraulic pressure sensor 86) that is indicative of the expected mass throughput. This value is used (in an interaction with the second comparison module 110, the control circuit 112, and the swash plates of the hydrostatic transmission 50) to control the ground speed "V" of the combine harvester 10 to maintain a desired value of the mass throughput. To this end, the electronic control 80 uses the data of the radar distance sensor 90.

A feedback circuit comprises the hydraulic pressure sensor 86, the time delay module 113, the third comparison module 114, and the mass throughput determining module 116. The feedback circuit can be considered, in the terminology of measurement and control technology, as an observer.

The feedback circuit senses a value indicative of the actual mass throughput (i.e. the pressure ($p_R$) in the hydraulic pressure sensor 86). The feedback circuit receives a value ($<p_R>$) indicative of the expected mass throughput ($<m>'$). In the third comparison module 114 the feedback circuit determines the difference between these values.

This difference in values (i.e. $p_R - <p_R>$) indicates an error in the expected mass throughput ($<m>'$) as calculated by the mass flow calculator 104.

To correct this error, the feedback circuit converts the difference in values (i.e. the error) into compatible units of mass throughput in the mass throughput determining module 116 to generate a mass throughput error signal (m').

The feedback circuit then provides the mass throughput error signal (m') to the first comparison module 106.

The first comparison module 106 then combines the mass throughput error signal (m') and the expected mass throughput signal ($<m>'$) to thereby correct the expected mass throughput signal ($<m>'$). This corrected expected mass throughput signal is communicated as an input to the combine model 108 to adjust the state of the combine model 108 accordingly.

The mass flow calculator 104 and the combine harvester model 108 set up physical or mathematical multivariable models, implemented with software technology, and can set them up linearly or nonlinearly, dynamically or statically, time-variant or time-invariant, automatically based or on neutral networks, or based on characteristic curves or characteristic diagrams.

The invention under consideration is suitable not only for a group of crop plants 96 that stands upright, as described previously, but also for plants in a swath or that lie flat.

Other refinements of the combine harvester 10 are conceivable. Thus, the expected pressure (<p>) generated by the combine harvester model 108 can also be used for the automatic adjustment of work parameters of the threshing and separating rotor 37 (e.g. the rotational speed and the threshing gap) and/or the automatic adjustment of work parameters of the cleaning system 26 (e.g. the blower rotational speed and the sieve openings), since it contains information regarding the mass throughput, based on which the aforementioned work parameters can be optimized.

As additional input variables of the combine harvester model 108 for the determination of the expected pressure (<p>), crop characteristics can be used, such as the moisture of the straw and/or the ears or the mechanical characteristics of the crops or the broken grain fraction in the grain tank 28 or losses detected by means of a loss sensor (not shown) at the outlet of the rotor 37 and/or the cleaning system 26 and/or the mass throughput and/or the grain fraction in a returns conveyor.

The invention claimed is:

1. A combine harvester (10), comprising:
   driving means (14) for moving the combine harvester (10) at a ground speed ("V") over a field;
   a system for detecting physical characteristics of a group of crop plants (96) standing in front of the combine harvester (10) and for calculating an expected mass throughput of the combine harvester (10) from said detected physical characteristics;
   an electronic control (80), which is configured to automatically control the ground speed ("V") of the combine harvester (10) to maintain a desired mass throughput of the combine harvester (10) by taking into consideration the expected mass throughput of the combine harvester (10); and
   a sensor (86) for detecting a parameter of the combine harvester (10) indicative of an actual mass throughput of the combine harvester (10);
   wherein the electronic control (80) is configured to compare an output value of the sensor (86) to a value indicative of the expected mass throughput and to use a result of the comparison as a feedback value to control the ground speed ("V") of the combine harvester (10);
   wherein the system comprises a distance sensor (90) having a transmitter (92) for transmitting successive electromagnetic waves against a group of crop plants (96) standing in front of the combine harvester (10), a receiver (94) configured to receive reflections of the successive electromagnetic waves from the group of crop plants (96), and an evaluation unit (98) for calculating the expected mass throughput in the combine harvester (10), with an aid of traveling times and/or amplitudes of the reflections;
   wherein the successive electromagnetic waves from the transmitter (92) are radiated, horizontally and/or vertically polarized radar waves, wherein the receiver (94) receives vertically polarized radar waves and/or horizontally polarized radar waves reflected from the group of crop plants (96), wherein the successive electromagnetic waves comprise radar waves of a single frequency or of different frequencies, and the evaluation unit (98) is configured to calculate a time derivation of a space filling degree of the group of crop plants (96) with dry mass and water and a taken-up volume ($<V_T>$), with an aid of the radar waves received.

2. A combine harvester (10), comprising:
   driving means (14) for moving the combine harvester (10) at a ground speed ("V") over a field;
   a system for detecting physical characteristics of a group of crop plants (96) standing in front of the combine harvester (10) and for calculating an expected mass throughput of the combine harvester (10) from said detected physical characteristics;
   an electronic control (80), which is configured to automatically control the ground speed ("V") of the combine harvester (10) to maintain a desired mass throughput of the combine harvester (10) by taking into consideration the expected mass throughput of the combine harvester (10); and
   a sensor (86) for detecting a parameter of the combine harvester (10) indicative of an actual mass throughput of the combine harvester (10);
   wherein the electronic control (80) is configured to compare an output value of the sensor (86) to a value indicative of the expected mass throughput and to use a result of the comparison as a feedback value to control the ground speed ("V") of the combine harvester (10);
   wherein the sensor (86) detects a pressure in a hydraulic cylinder (66), wherein said hydraulic cylinder (66) is configured to adjust a belt variator for driving an axial threshing and separating rotor (37).

3. The combine harvester (10) according to claim 2, wherein the electronic control (80) is configured to take into consideration a time delay between the producing of a value dependent on the expected mass throughput and a magnitude detected by the sensor (86).

4. The combine harvester (10) according to claim 2, wherein the electronic control (80) comprises a model (108) of the combine harvester (10), which is used for a determination of a value dependent on the expected mass throughput, which is also used for a specification of the ground speed ("V").

5. The combine harvester (10) according to claim 4, wherein the electronic control (80) is configured to compare the value dependent on the expected mass throughput, which is time-delayed, to the value of the sensor (86).

* * * * *